US010243974B2

(12) United States Patent
Manjunath et al.

(10) Patent No.: US 10,243,974 B2
(45) Date of Patent: Mar. 26, 2019

(54) DETECTING DEAUTHENTICATION AND DISASSOCIATION ATTACK IN WIRELESS LOCAL AREA NETWORKS

(71) Applicant: Aruba Networks, Inc., Sunnyvale, CA (US)

(72) Inventors: Naveen Manjunath, Bangalore Karnataka (IN); Santashil PalChaudhuri, Bangalore Karnataka (IN); Deepakparasar Avalur, Bangalore Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 182 days.

(21) Appl. No.: 15/235,737

(22) Filed: Aug. 12, 2016

(65) Prior Publication Data
US 2017/0244732 A1 Aug. 24, 2017

(30) Foreign Application Priority Data

Feb. 19, 2016 (IN) .............................. 201641005781

(51) Int. Cl.
*H04L 29/06* (2006.01)
*H04L 29/12* (2006.01)
(Continued)

(52) U.S. Cl.
CPC ...... *H04L 63/1416* (2013.01); *H04L 61/6022* (2013.01); *H04W 12/12* (2013.01); *H04W 8/26* (2013.01); *H04W 84/12* (2013.01)

(58) Field of Classification Search
CPC ........... H04L 63/1416; H04L 61/6022; H04W 72/0453
See application file for complete search history.

(56) References Cited

U.S. PATENT DOCUMENTS

2008/0031209 A1* 2/2008 Abhishek .............. H04W 8/005
370/338
2010/0299725 A1 11/2010 Yamada
(Continued)

FOREIGN PATENT DOCUMENTS

GB 2410154 B 8/2008

OTHER PUBLICATIONS

Cheema et al. (Deauthentication/Disassociation Attack: Implementation and Security in Wireless Mesh Networks, International Journal of Computer Applications vol. 23—No. 7, Jun. 2011, pp. 7-15) (Year: 2011).*

(Continued)

*Primary Examiner* — Oleg Korsak
(74) *Attorney, Agent, or Firm* — Hewlett Packard Enterprise Patent Department

(57) ABSTRACT

The present disclosure relates to a network device that detects a deauthentication and/or disassociation attack in a wireless local area network (WLAN). In example implementations, the network device selects a random Media Access Control (MAC) address that is unused in the WLAN. The network device then transmits a request using the selected MAC address over a shared wireless communication channel. Next, the network device transmits a response using a MAC address corresponding to the network device over the shared wireless communication channel. Subsequently, the network device receives a disconnection request using the selected MAC address over the shared wireless communication channel. In response to receiving the disconnection request, the network device can detect an attacker device in the WLAN.

6 Claims, 11 Drawing Sheets

(51) Int. Cl.
*H04W 12/12* (2009.01)
*H04W 84/12* (2009.01)
*H04W 8/26* (2009.01)

(56) References Cited

U.S. PATENT DOCUMENTS

2014/0025842 A1* 1/2014 Li .................. H04L 63/0876
                                                           709/245
2015/0304280 A1  10/2015 Marshall et al.
2017/0223657 A1*  8/2017 Sen .................. H04W 64/00

OTHER PUBLICATIONS

Bicakci et al. (Denial-of-Service attacks and countermeasures in IEEE 802.11 wireless networks, Computer Standards & Interfaces 31 (2009) 931-941) (Year: 2009).*
Faria et al. (Detecting Identity-Based Attacks in Wireless Networks Using Signalprints, WiSe'06, Sep. 29, 2006, pp. 43-52) (Year: 2006).*
"WLAN WIDs Technology White Paper," Apr. 24, 2014, pp. 1-28, Issue: 1.0, Huawei Technologies Co., Ltd.
Le Wang, "Detection of Man-in-the-middle Attacks Using Physical Layer Wireless Security Techniques," Jul. 2013, pp. 1-104, Thesis, Worcester Polytechnic Institute.
Rupinder Singh Gill, "Intrusion Detection Techniques in Wireless Local Area Networks," Jun. 2, 2009, pp. 1-294, Thesis, Queensland University of Technology.

* cited by examiner

DETECTING DEAUTHENTICATION AND DISASSOCIATION ATTACK IN WIRELESS LOCAL AREA NETWORKS

BACKGROUND

Since wireless local area network (WLAN) management frames are often unencrypted, an attacker can potentially attack the WLAN infrastructure by spoofing the Media Access Control (MAC) address of a client device that is associated with the WLAN, and sending a deauthentication and/or disassociation frame using the MAC address of the associated client device. Because the WLAN infrastructure cannot determine that the deauthentication and/or disassociation frame is from an attacker or a valid client device, it will terminate the client device's connection to the WLAN. As a result, a valid client device will experience denial of service by the WLAN infrastructure.

BRIEF DESCRIPTION OF THE DRAWINGS

The following detailed description references the drawings, wherein.

DETAILED DESCRIPTION

Figure 1:
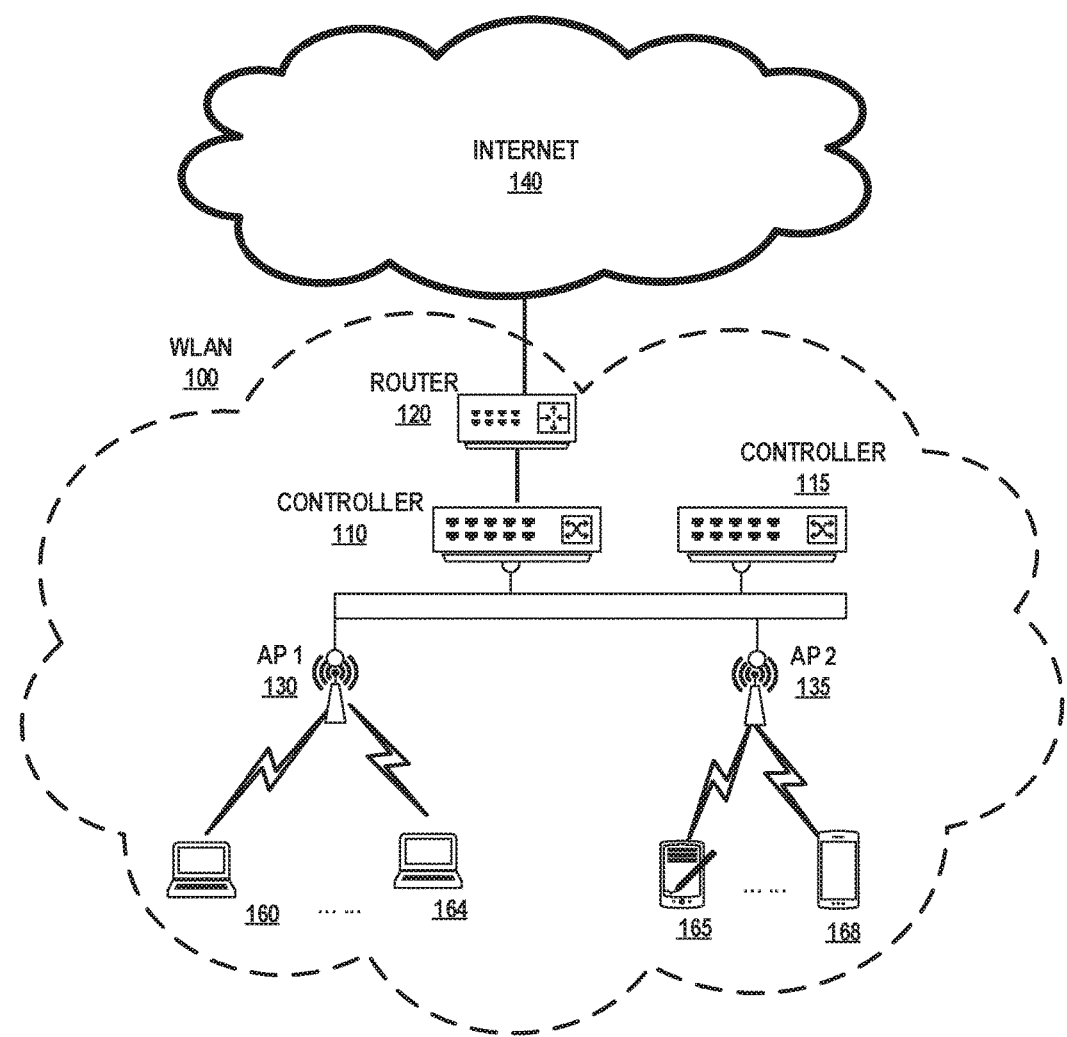
FIG. 1 is a block diagram of an example networking environment for a wireless local area network.

In the following description, several specific details are presented to provide a thorough understanding. While the context of the disclosure is directed to network security in a wireless local area network, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. As used herein, the term "implementation" generally refers an implementation that serves to illustrate by way of example but not limitation. It should be understood that this disclosure covers all modifications, equivalents, and alternatives falling within the spirit and scope of the present disclosure.

Overview

The present disclosure relates to network security in a wireless local area network. In particular, the present disclosure relates to detecting a deauthentication and/or disassociation attack a wireless local area network (WLAN). Specifically, since WLAN management frames are often unencrypted, a security attacker to a WLAN infrastructure can spoof the MAC address of a client device that is associated with the WLAN, and send a deauthentication and/or disassociation packet to the access point (AP) that the client device is associated with.

Access Points (APs) in a WLAN typically honor the deauthentication and/or disassociation requests received from client devices. The APs will clean up client state internally upon receiving such requests from the client devices. Therefore, it is easy for a security attacker to sniff the WLAN infrastructure and to obtain the MAC addresses of associated client devices. The security attacker can then transmit a deauthentication and/or disassociation packet using each of the spoofed client MAC addresses. Because there is no way for the WLAN infrastructure to distinguish between a spoofed deauthentication and/or disassociation request and an authentic deauthentication and/or disassociation request, an AP will terminate the client association and treat the deauthentication and/or disassociation request as a valid request sent by the associated client device. Consequently, the originally associated client device will experience denied service by the AP, and be forced to reconnect to the WLAN to restore access. Also, with certain client driver implementations, the client devices can potentially blacklist the WLAN due to prior denied services.

With the solution provided herein, a network device selects a random Media Access Control (MAC) address that is unused in a wireless local area network (WLAN). The network device then transmits a first request using the selected MAC address over a shared wireless communication channel. Next, the network device trans response using a MAC address corresponding to the network device over the shared wireless communication channel. Subsequently, the network device receives a disconnection request using the selected MAC address over the shared wireless communication channel. Then, the network device detects an attacker in the WLAN in response to receiving the disconnection request.

In some implementations, instead of transmitting the first response using the MAC address corresponding to the network device, the network device receives a response over the shared wireless communication channel from a second network device (e.g., another access point) in the WLAN. Additionally, upon receiving a disconnection request, the network device will transmit a message over a wired connection to determine whether the disconnection request is indeed transmitted by the second network device. Thereafter, the network device detects an attacker in the WLAN if it determines that the connection request is not transmitted by the second network device.

Computing Environment

FIG. 1 shows an example networking environment for a wireless local area network. FIG. 1 includes a router 120 that connects to one or more network controllers (e.g., network controller 110 and network controller 115) in a wireless local area network (WLAN) 100. WLAN 100 is also connected to Internet 140.

As used herein, "wireless local area network" (WLAN) generally refers to a communications network that links two or more devices using some wireless distribution mechanisms (for example, spread-spectrum or orthogonal frequency-division multiplexing radio). WLAN usually provides a connection through an access point to the Internet; and thus, providing users with the mobility to move around within a local coverage area and still stay connected to the network.

Network controller 110 and/or network controller 115 are communicatively coupled with one or more access points, such as AP1 130 and AP2 135, to provide wireless network services to a number of wireless client devices, such as client devices 160-164 and client devices 165-168.

As used herein, "access point" (AP) generally refers to receiving points for any known or convenient wireless access technology which may later become known. Specifically, the term AP is not intended to be limited to IEEE 802.11-based APs. An AP generally functions as an electronic device that is adapted to allow wireless devices to connect to a wired network via various communication standards.

Networks according to the present disclosure may operate on a private network including one or more local area networks. The local area networks may be adapted to allow wireless access, thereby operating as a wireless local area network (WLAN). In some implementations, the one or more local area networks may share the same extended service set (ESS) although each network corresponds to a unique basic service set (BSS) identifier.

In addition, network depicted in FIG. 1 may include multiple network control plane devices, such as network controllers, switches, or routers capable of controlling networking functions. Each network control plane device may be located in a separate sub-network. The network control plane device may manage one or more network management devices, such as access points or network servers, within the sub-network.

In some implementations, network controllers (e.g., network controller 110 and network controller 115) support clustering and centralized management. For example, a master network controller can manage a number of local network controllers. The local network controllers collectively can support a large number of client devices (e.g., up to 32,000 client devices) in the WLAN at the same time.

For illustration purposes only, in the example network depicted in FIG. 1, a number of client devices are connected to the access points in WLAN 100. For example, client devices 160-164 are associated with AP1 130, and client devices 165-168 are associated with AP2 135. Note that client devices may be connected to the access points via either wired or wireless connections.

As used herein, the term "link" or "connection" (or used descriptively as "connected") is generally defined as a communication pathway established over an information-carrying medium. The "link" or "connection" may be a wired interconnect, wherein the medium is a physical medium (e.g., electrical wire, optical fiber, cable, bus traces, etc.), a wireless interconnect (e.g., air in combination with wireless signaling technology), or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames, or cells.

Deauthentication and/or Disassociation Attack

Figure 2:
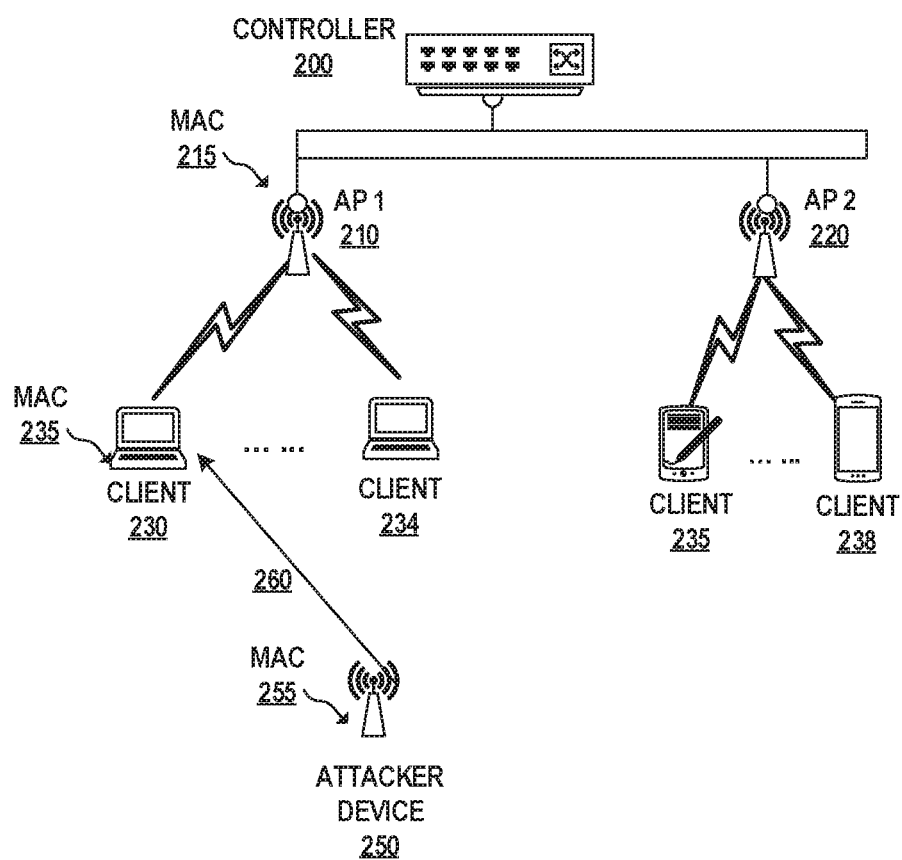
FIG. 2 is a block diagram of an example networking environment illustrating a deauthentication and/or disassociation attack on the wireless local area network.

FIG. 2 is a block diagram of an example networking environment illustrating a deauthentication and/or disassociation attack on a wireless local area network. Specifically, FIG. 2 includes at least a network controller 200 and a number of APs in the WLAN, such as AP1 210 and AP2 220. In addition, a number of client devices are connected to the access points in the wireless local area network illustrated in FIG. 2. For example, client devices 230-234 are associated with AP1 210, and client devices 235-238 are associated with AP2 220.

When a client device (e.g., client device 230) connects to an access point (e.g., AP1 210) in the WLAN, the client device and the AP perform certain communication exchanges over a shared wireless communication channel following a wireless communication protocol. For example, first, client device 230 may transmit a probe request message over the shared wireless communication channel to access points in the WLAN. The probe request is typically a broadcast message. Client device 230 may send a probe request message to each shared wireless communication channel over which client device 230 is capable of communicating.

Upon receiving the probe request message from client device 230, an access point may respond with a probe response message over the shared wireless communication channel. Typically, the probe request message and the probe response message are not encrypted. Therefore, any wireless digital devices (e.g., wireless client devices or wireless access points) can receive the probe request message and/or the probe response message, and obtain information (e.g., source MAC address and/or destination MAC address) from those messages if they are capable of communicating over the same shared wireless communication channel.

It is possible that a plurality of access points in the WLAN respond to the probe request message from client device 230. When client device 230 receive the probe response messages from one or more access points in the WLAN, client device 230 selects one particular access points (e.g., AP1 210) to connect with. Then, client device 230 transmits an authentication request message to the selected AP (e.g., AP1 210). Next, the selected AP (e.g., AP1 210) will send an authentication response message to client device 230. The authentication request message generally is a frame signifying to the network membership within the WLAN topology. The authentication function is handled by an exchange of management packets. Note that, in some implementations, the number of packets exchanged may depend on the authentication mechanism employed.

Next, upon successful authentication, client device 230 will send an association request message to the selected AP (e.g., AP1 210). The association request message carries information about the network interface card (NIC) (e.g., supported data rates) and the service set identifier (SSID) of the wireless network that a client device wishes to associate with. The selected AP (e.g., AP1 210) will then reply with an association response message to client device 230. The association response message contains an acceptance or rejection notice to the radio NIC of the client device requesting association. If the selected AP (e.g., AP1 210) accepts the association from client device 230, the association response message includes information regarding the association, including but not limited to, the association ID and supported data rates. Also, the selected AP reserves memory space and establishes an association ID for the NIC.

In some implementations, when client device 230 roams away from an AP (e.g., AP1 210) and attempts to associate with another AP (e.g., AP2 220) in the WLAN, client device 230 may send a reassociation request message instead of the association request message. The reassociation request message is similar to the association request message, but is mainly useful in client roaming. For example, if client device 230 roams away from the currently associated access point (e.g., AP1 210) and finds another access point (e.g., AP2 220) having a stronger beacon signal, client device 230 will send a reassociation request message to the new access point (e.g., AP2 220). The new access point (e.g., AP2 220) then coordinates the forwarding of data frames that may still be in the buffer of the previous access point (e.g., AP1 210) waiting for transmission to client device 230.

Moreover, FIG. 2 also includes an attacker, Attacker Device 250, to the WLAN infrastructure. Here, Attacker Device 250 can be an unauthorized access point or any unauthorized device that is deployed illegitimately within the coverage area of the WLAN. Note that Attacker Device 250 potentially can be run by any client device by injecting packets over a shared wireless network communication channel. For purpose of illustration, assuming that AP1 210 has a MAC address of MAC 215; client device 230 has a MAC address of MAC 235; and, Attacker Device 250 has a MAC address of MAC 255. Further, Attacker Device 250 can be configured to switch its operating channel through each shared wireless communication channel in the WLAN and to listen for traffic on each shared wireless communication channel. Because none of the aforementioned communication exchanges between client device 230 and the selected AP (e.g., AP1 210) is secured, Attacker Device 250 can sniff network packets on the shared wireless communication channel and receive all of the request and response messages transmitted between client device 230 and AP1 210.

Therefore, Attacker Device 250 can obtain the MAC address of the associated client device (e.g., MAC 235 of client device 230) and/or the MAC address of the selected AP (e.g., MAC 215 of AP1 210). Subsequently, Attacker Device 250 can transmit a disconnection message 260 to break the connection between client device 230 and AP1 210. For example, Attacker Device 250 can transmit a deauthentication message using MAC 215 of AP1 210 instead of its own MAC address (i.e., MAC 255 of Attacker Device 250) as the source MAC address. Likewise, Attacker Device 250 can transmit a disassociation message using MAC 235 of client device 230 instead of its own MAC address (i.e. MAC 255 of Attacker Device 250) as the source MAC address.

There is no way for an AP (e.g., AP1 210) to determine whether a disassociation request message is from an authentic client device (e.g., client device 230). Likewise, it is unlikely that a client device (e.g., client device 230) can determine whether a deauthentication request message is from an authorized access point (e.g., AP1 210). Generally, when an AP (e.g., AP1 210) and/or client device (e.g., client device 230) receives a deauthentication and/or disassociation message, the deauthentication/disassociation message is treated as if it was sent from a legitimate network device and/or client device. Therefore, the connection between AP1 210 and client device 230 will be terminated. AP1 210 will further clean up client state internally. This leads to the originally associated client device (e.g., client device 230) being denied service by the AP (e.g., AP1 210), forcing the client device (e.g., client device 230) to reconnect to the WLAN in order to restore access.

Detecting Deauthentication/Disassociation Attack by Active Probing

Figure 3:
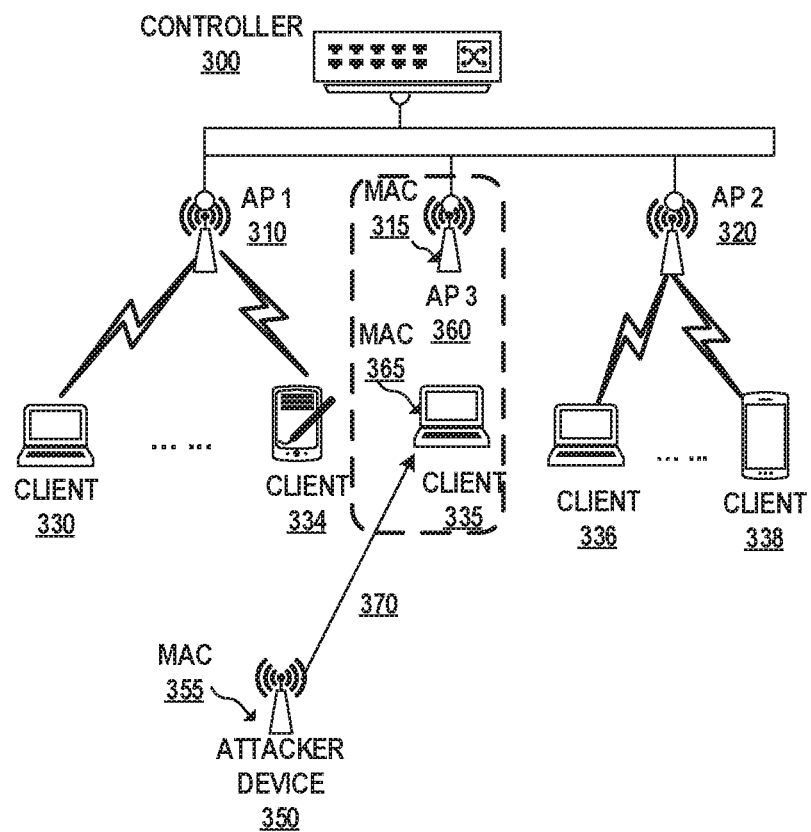
FIG. 3 is a block diagram of an example networking environment for detecting a deauthentication and/or disassociation attack on the wireless local area network.

FIG. 3 is a block diagram of an example networking environment for detecting a deauthentication and/or disassociation attack on the wireless local area network. Specifically, FIG. 3 includes at least a network controller 300 and a number of APs in the WLAN, such as AP1 310 and AP2 320. In addition, a number of client devices are connected to the access points in the wireless local area network illustrated in FIG. 3. For example, client devices 330-334 are associated with AP1 310, and client devices 336-338 are associated with AP2 320.

In addition, FIG. 3 includes an access point AP3 360 that emulates WLAN client behaviors. Like AP1 310 and AP2 320, AP3 360 is connected to a number of client devices and is managed by network controller 300. In particular, AP3 360 has a corresponding MAC address of MAC 315. However, AP3 360 also can randomly select a MAC address (e.g., MAC 365) that is different from its own MAC address (e.g., MAC 315) and that is unused in the WLAN. Furthermore, AP3 360, acting as client device 335, can use the selected MAC address (e.g., MAC 365) to transmit one or more requests over the shared wireless communication channel. When other network devices (e.g., controller 300, AP1 310, AP2 320, etc.) receive the requests from AP3 360 over the shared wireless communication channel, they will treat the requests as being sent from client device 335, even though client device 335 does not physically exist in the WLAN.

Moreover, FIG. 3 includes an attacker, Attacker Device 350, to the WLAN infrastructure. Here, Attacker Device 350 is an unauthorized access point or any unauthorized device that is deployed illegitimately within the coverage area of the WLAN. Attacker Device 350 has a corresponding MAC address of MAC 355. Further, Attacker Device 350 can be configured to listen for traffic on the shared wireless communication channel. When Attacker Device 350 hears certain communication exchanges between a client device and an AP over the shared wireless communication channel (e.g., a probe request, a probe response, an authentication request, an authentication response, an association/reassociation request, an association/reassociation response, etc.), Attacker Device 350 may determine that a connection has been successfully established between the client device and the AP. Therefore, Attacker Device 350 can obtain the MAC address of the associated client device and/or the MAC address of the AP. Subsequently, Attacker Device 350 can transmit a disconnection message 370 to break the connection between the client device and the AP using the associated client device's MAC address instead of its own MAC address (e.g., MAC 355). The disconnection message may be a deauthentication message or a disassociation message.

There are at least two ways that an AP can detect the attacker Attacker Device 350 in the above scenario. First, the AP may act as a client device and an AP that serves the client device at the same time. Second the AP may collaborate with other authorized APs in the WLAN to detect the attacker.

A. Active Probing by Single Access Point

Figure 4:
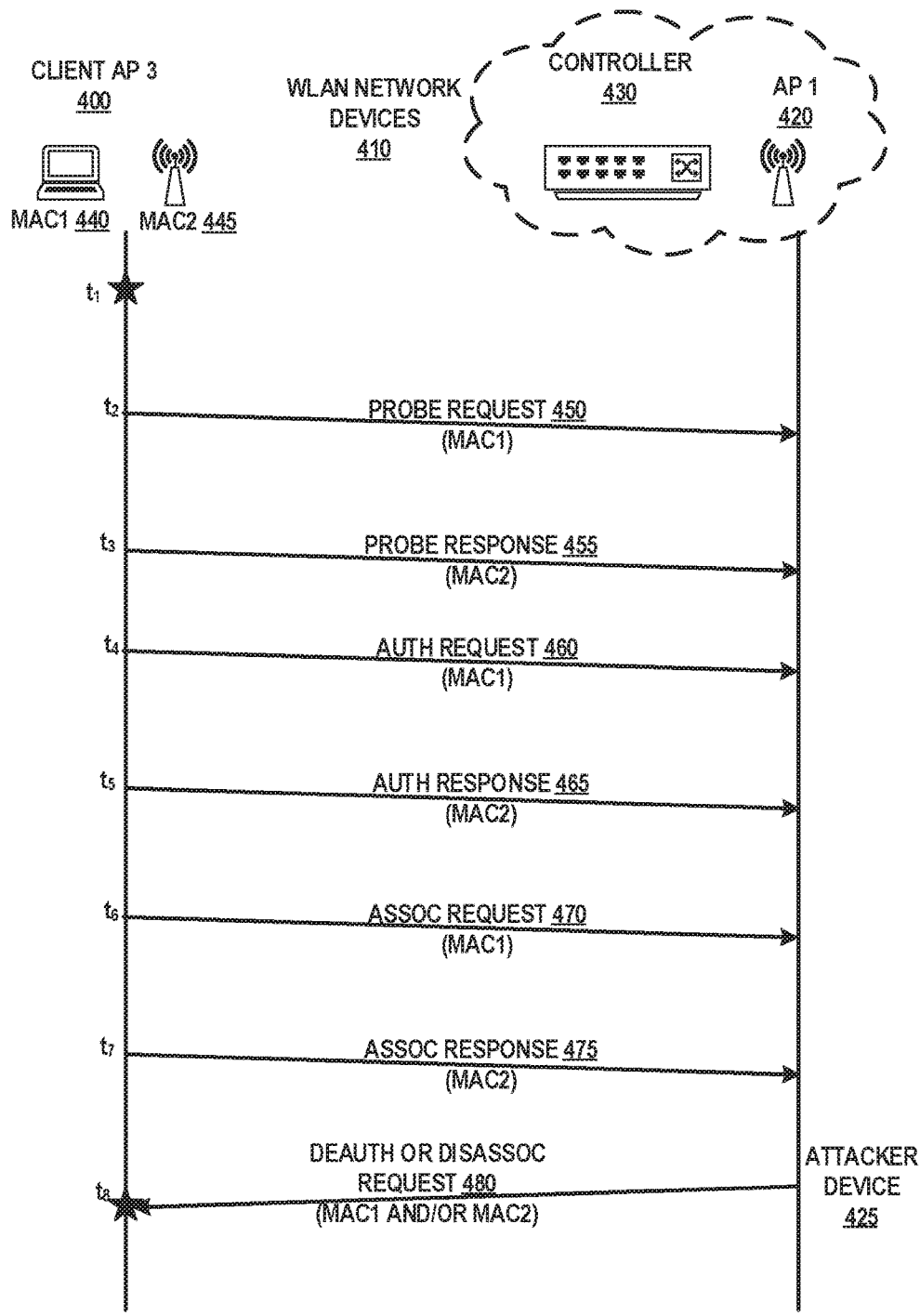
FIG. 4 is a sequence diagram of an example mechanism for detecting a deauthentication and/or disassociation attack on the wireless local area network.

FIG. 4 is a sequence diagram of an example mechanism for detecting a deauthentication and/or disassociation attack on the wireless local area network. As used herein, the term "mechanism" generally refers to a component of a system or device to serve one or more functions, including but not limited to, software components, electronic components, electrical components, mechanical components, electro-mechanical components, etc.

Specifically, FIG. 4 includes an access point that can act as a client device (hereinafter referred to as "Client AP3 400") and a number of WLAN network devices 410. Further, WLAN network devices 410 may include a plurality of network controllers and/or access points, including but not limited to, controller 430 and AP1 420. Network controller 430 manages the access points and client devices in the WLAN.

The access points in the WLAN may operate on one or more of shared wireless communication channels. They serve a number of wireless client devices by providing wireless network access to the client devices. Not all access points in WLAN network devices 410 are authorized by the WLAN. For example, an attacker may place an AP within the coverage area of WLAN to spoof communication exchanges between the client devices and authorized APs in the WLAN. Then, the attacker can use the spoofed information to start a deauthentication and/or disassociation attack. Unlike authorized APs in the WLAN, an AP from an attacker will not be able to connect to the network controllers and/or peer APs in the WLAN via a wired or otherwise secured connection.

In FIG. 4, Client AP3 400 is communicatively coupled to WLAN network devices 410. In particular, Client AP3 400 is connected to network controller 430 via a wired connection. When Client AP3 400 acts as an access point in the WLAN, Client AP3 400 uses its own MAC address, e.g., MAC2 445. On the other hand, when Client AP3 400 acts as a client device in the WLAN, Client AP3 400 uses a randomly selected MAC address, e.g., MAC1 440.

Specifically, at time point $t_1$, Client AP3 400 selects a random MAC address (e.g., MAC1 440). The randomly selected MAC address (e.g., MAC1 440) is different from Client AP3 400's own MAC address (e.g., MAC2 445) and is unused by other client devices in the WLAN.

Thereafter, Client AP3 400 transmits a number of messages over a shared wireless communication channel in the WLAN. In particular, at time point $t_2$, Client AP3 400, acting as a client device, transmits a probe request message 450 using MAC1 440 over the shared wireless communication channel. At time point $t_3$, Client AP3 400, acting as an access point, transmits a probe response message 455 using MAC2 445 over the shared wireless communication channel. Next, at time point $t_4$, Client AP3 400, acting as a client device, transmits an authentication request message 460 using MAC1 440 over the shared wireless communication channel. At time point $t_5$, Client AP3 400, acting as an access point, transmits an authentication response message 465 using MAC2 445 over the shared wireless communication channel. Subsequently, at time point $t_6$, Client AP3 400, acting as a client device, transmits an association request message 470 (or a reassociation request message) using MAC1 440 over the shared wireless communication channel. At time point $t_7$, Client AP3 400, acting as an access point, transmits an association response message 475 (or a reassociation response message) using MAC2 445 over the shared wireless communication channel.

Because all of the above communication exchanges are transmitted over the shared wireless communication channel without any encryption, an unauthorized device, e.g., Attacker Device 425, can sniff network packets on the shared wireless communication channel and receive all of the above messages, including probe request message 450, probe response message 455, authentication request message 460, authentication response message 465, association request message 470, association response message 475, etc. Therefore, upon the completion of the above communication exchanges, the unauthorized device (e.g., Attacker Device 425) will determine that a connection has been successfully established between a client device with an MAC address of MAC1 440 and an access point with an MAC address of MAC2 445.

In order to break the perceived connection between the client device and the access point, the unauthorized device (e.g., Attacker Device 425) will transmit a deauthentication and/or disassociation request 480 using MAC1 440 and/or MAC2 445 that the unauthorized device (e.g., Attacker Device 425) sniffed from the shared wireless communication channel.

At time point $t_8$, Client AP3 400 receives the deauthentication and/or disassociation request 480 from unauthorized Attacker Device 425 using MAC1 440 and/or MAC2 445. Because Client AP3 400 does not send any deauthentication and/or disassociation request, Client AP3 400 can determine that the received deauthentication and/or disassociation request 480 is sent by an attacker to the WLAN infrastructure.

B. Active Probing by Collaborating Access Points

Figure 5:
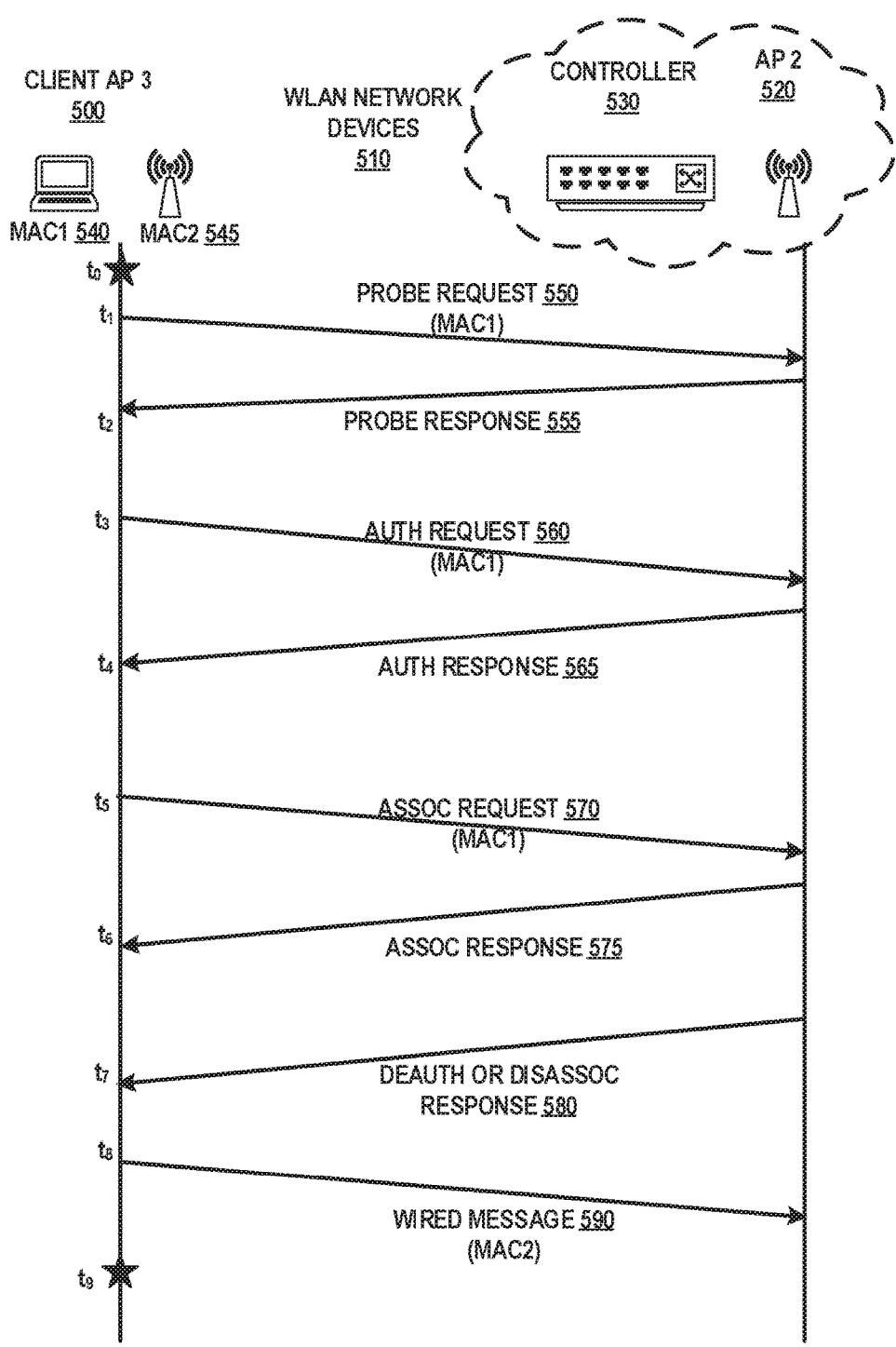
FIG. 5 is a sequence diagram of an example mechanism for detecting a deauthentication and/or disassociation attack on the wireless local area network.

FIG. 5 is a sequence diagram of an example mechanism for detecting a deauthentication and/or disassociation attack on the wireless local area network. Specifically, FIG. 5 includes an access point that can act as a client device (hereinafter referred to as "Client AP3 500") and a number of WLAN network devices 510. Further, WLAN network devices 510 may include a plurality of network controllers and/or access points, including but not limited to, controller 530 and AP2 520. Network controller 530 manages the access points and client devices in the WLAN.

The access points in the WLAN may operate on one or more of shared wireless communication channels. They serve a number of wireless client devices by providing wireless network access to the client devices. Moreover, the APs are connected to network controller 530 via wired connections. In addition, the APs in the WLAN can connect to the peer APs via wired connections too.

Not all access points in WLAN network devices 510 are authorized by the WLAN. For example, an attacker may place an AP within the coverage area of WLAN to spoof communication exchanges between the client devices and authorized APs in the WLAN. Then, the attacker can use the spoofed information to start a deauthentication and/or disassociation attack. Unlike authorized APs in the WLAN, an AP from an attacker will not be able to connect to the network controllers and/or peer APs in the WLAN via a wired or otherwise secured connection.

Client AP3 500 is communicatively coupled to WLAN network devices 510. In particular, Client AP3 500 is connected to network controller 530 and/or a peer authorized AP, such as AP2 520, via a wired connection. When Client AP3 500 acts as an access point in the WLAN, Client AP3 500 uses its own MAC address, e.g., MAC2 545. On the other hand, when Client AP3 500 acts as a client device in the WLAN, Client AP3 500 uses a randomly selected MAC address, e.g., MAC1 540.

Specifically, at time point $t_0$, Client AP3 500 selects a random MAC address MAC1 540. The randomly selected MAC address is different from Client AP3 500's own MAC address (e.g., MAC2 545) and is unused by other client devices in the WLAN.

Next, at time point $t_1$, Client AP3 500, acting as a client device, transmits a probe request message 550 using MAC1 540 over the shared wireless communication channel. At time point $t_2$, Client AP3 400 receives a probe response message 555 from a peer AP (e.g., AP2 520) in response to probe request message 550 over the shared wireless communication channel.

Thereafter, at time point $t_3$, Client AP3 500, acting as a client device, transmits an authentication request message 560 using MAC1 540 over the shared wireless communication channel. At time point $t_4$, Client AP3 500 receives an authentication response message 565 from the peer AP (e.g., AP2 520) over the shared wireless communication channel in response to authentication request message 560.

Subsequently, at time point $t_5$, Client AP3 500, acting as a client device, transmits an association request message 570 (or a reassociation request message) using MAC1 540 over the shared wireless communication channel. At time point $t_6$, Client AP3 500 receives an association response message 575 (or a reassociation response message) from the peer AP (e.g., AP2 520) over the shared wireless communication channel in response to association request message 570 (or reassociation request message).

Because all of the above communication exchanges are transmitted over the shared wireless communication channel without any encryption, an unauthorized attacker device can sniff network packets on the shared wireless communication channel and receive all of the above messages, including probe request message 550, probe response message 555, authentication request message 560, authentication response message 565, association request message 570, association response message 575, etc. Therefore, upon the completion of the above communication exchanges, the unauthorized attacker device will determine that a connection has been successfully established between a client device with an MAC address of MAC1 540 and an access point with an MAC address of MAC2 545.

In order to break the perceived connection between the client device and the access point, the unauthorized attacker device will transmit a deauthentication and/or disassociation request 580 using MAC1 540 and/or MAC2 545, which the unauthorized attacker device sniffed from the shared wireless communication channel. At time point $t_7$, Client AP3 500 receives the deauthentication and/or disassociation request 580.

In order to determine whether the received deauthentication and/or disassociation request 580 is from an unauthorized attacker device, at time point $t_8$, Client AP3 500 transmits a wired message 590 to network controller 530 and/or the peer AP (e.g., AP2 520). Wired message 590 uses AP3's MAC address (e.g., MAC2 545) as the source MAC address. Also, wired message 590 serves as an inquiry to check whether a deauthentication and/or disassociation message has been sent.

In some implementations, Client AP3 500 can send the wired message to network controller 530. Because network controller 530 provides centralized managements to the APs and client devices in the WLAN, network controller 530 can determine whether deauthentication and/or disassociation message 580 was sent by an authorized access point or client device.

In some implementations, Client AP3 500 can send the wired message to a peer AP (e.g., AP2 520) that responded to the requests that Client AP3 500 sent out while acting as a client device. The peer AP can then notify Client AP3 500 whether it has sent deauthentication and/or disassociation message 580.

If, at time point $t_9$, Client AP3 detects that deauthentication and/or disassociation request 580 is not sent by an authorized client device or access point in the WLAN, Client AP3 450 can determine that deauthentication and/or disassociation request 580 is sent by an attacker device to the WLAN infrastructure.

Active probing by multiple collaborative access points allows the wireless local area network to perform the active probing over a wider coverage area. For example, with a single access point, the mechanisms described herein will be able to detect deauthentication and/or disassociation attackers within the radio frequency neighborhood of an individual access point. However, by collaborating with multiple access points, the mechanisms described above can potentially detect attackers over a much larger coverage area, e.g., the combined coverage area provided by multiple access points in the WLAN.

Process to Detect Deauthentication and/or Disassociation Attack

Figure 6:
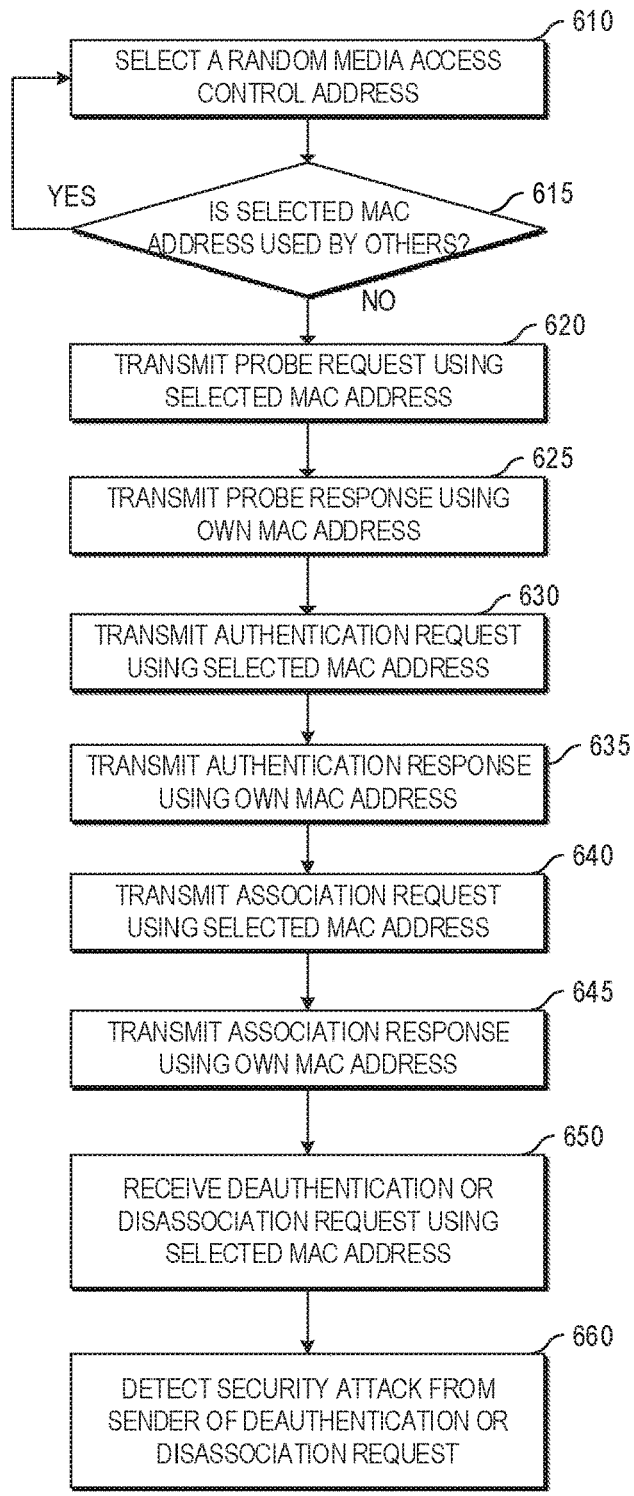
FIG. 6 is a flowchart of an example process for detecting a deauthentication and/or disassociation attack on the wireless local area network.

FIG. 6 is a flowchart of example process for detecting a deauthentication and/or disassociation attack on the wireless local area network. In this example, a network device begins the process by selecting a random Media Access Control (MAC) address (operation 610). Then, the network device determines whether the selected MAC address is used by other devices (operation 615). If so, the network device repeats the previous operation and selects another random MAC address (operation 610).

If the selected MAC address is unused by other devices in the WLAN, the network device proceeds to transmit a probe request using the selected MAC address (operation 620). Next, the network device transmits a probe response using its own MAC address (operation 625). Then, the network device transmits an authentication request using selected MAC address (operation 630). Thereafter, the network device transmits an authentication response using its own MAC address (operation 635). Moreover, the network device transmits an association (or reassociation) request using the selected MAC address (operation 640). Subsequently, the network device transmits an association (or reassociation) response using its own MAC address (operation 645).

Note that the probe request, the probe response, the authentication request, the authentication response, the association (or reassociation) request, and the association (or reassociation) response are all transmitted on a shared wireless communication channel without encryption. Therefore, an attacking network device may be configured to operate on the shared wireless communication channel and observe all of the above communication exchanges. Based on the observed communication exchanges, the attacking network device will determine that a wireless connection has been established successfully between a client device with the selected MAC address and an access point with the network device's own MAC address. In order to attack this perceived wireless connection between the client device and the access point, the attacking network device can transmit a deauthentication request and/or a disassociation request using the selected MAC address.

As a result, the network device will receive a deauthentication and/or a disassociation request using the selected MAC address (operation 650). The network device is aware that the selected MAC address is used to emulate a client device and there is no wireless connection established between an actual client device and the network device. Therefore, the network device can detect a security attack from the sender of the deauthentication and/or disassociation request (operation 660).

Figure 7:
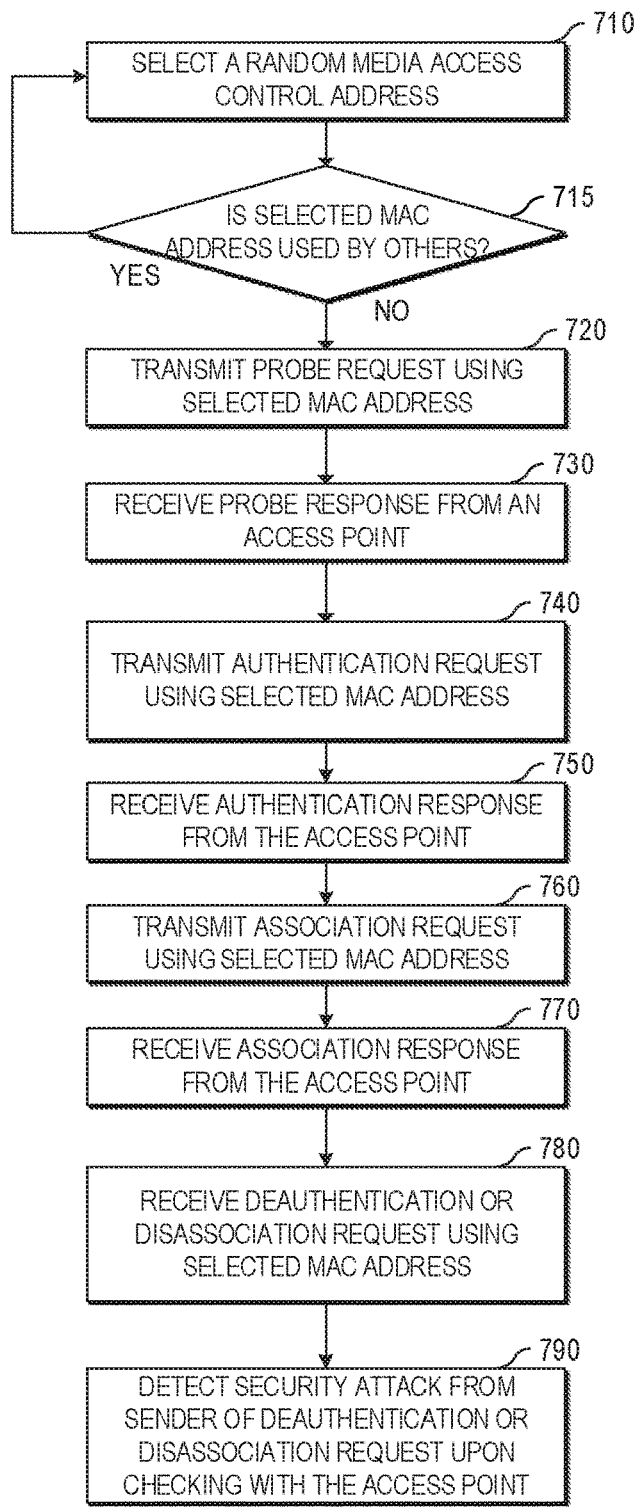
FIG. 7 is a flowchart of an example process for detecting a deauthentication and/or disassociation attack on the wireless local area network.

FIG. 7 is a flowchart of another example process for detecting a deauthentication and/or disassociation attack on the wireless local area network. In this example, the network device collaborates with another network device (e.g., another access point) in the WLAN to detect a deauthentication and/or disassociation attack. First, the network device begins the process by selecting a random Media Access Control (MAC) address (operation 710). Then, the network device determines whether the selected MAC address is used by other devices (operation 715). If so, the network device repeats the previous operation and selects another random MAC address (operation 710).

If the selected MAC address is unused by other devices in the WLAN, the network device proceeds to transmit a probe request using the selected MAC address (operation 720). Next, the network device receives a probe response from an access point in the WLAN (operation 730). Then, the network device transmits an authentication request using the selected MAC address (operation 740). Thereafter, the network device receives an authentication response from the access point (operation 750). Moreover, the network device transmits an association (or reassociation) request using the selected MAC address (operation 760). Subsequently, the network device receives an association (or reassociation) response from the access point (operation 770).

Here, again, the probe request, the probe response, the authentication request, the authentication response, the association (or reassociation) request, and the association (or reassociation) response are all transmitted on a shared wireless communication channel without encryption. Therefore, an attacking network device may be configured to operate on the shared wireless communication channel and observe all of the above communication exchanges. Based on the observed communication exchanges, the attacking network device will determine that a wireless connection has been established successfully between a client device with the selected MAC address and the access point in the WLAN that sent the responses. In order to attack this perceived connection between the client device and the access point, the attacking network device can transmit a deauthentication and/or a disassociation request using the selected MAC address.

As a result, the network device will receive a deauthentication and/or a disassociation request using the selected MAC address (operation 780). Here, the network device is aware that the selected MAC address is used to emulate a client device. However, unlike in the previous example, the network device cannot determine, based on the received deauthentication/disassociation request alone, whether the sender of the deauthentication/disassociation request is an attacker. Therefore, the network device will inquire the access point and detect a security attack from the sender of the deauthentication and/or disassociation request upon checking with the access point (operation 790).

Specifically, the network device can send a message via a wired or otherwise secured connection to the access point or to a network controller managing the access point and its associated client devices. The message may include an inquiry to determine whether the access point has transmitted a deauthentication and/or disassociation request to a client device having the selected MAC address. Because the wired connection is typically a secured connection that is only accessible to provisioned and authorized network devices. The attacking network device operating on the shared wireless communication channel will not receive the wired message. As a result, if the deauthentication and/or disassociation request is sent by the attacking network device, the network device would not receive a reply to the message, which was sent via the wired connection. Therefore, the network device can detect the security attack from the sender of the deauthentication and/or disassociation request based on the absence of reply to its inquiry message sent over the wired connection.

Figure 8:
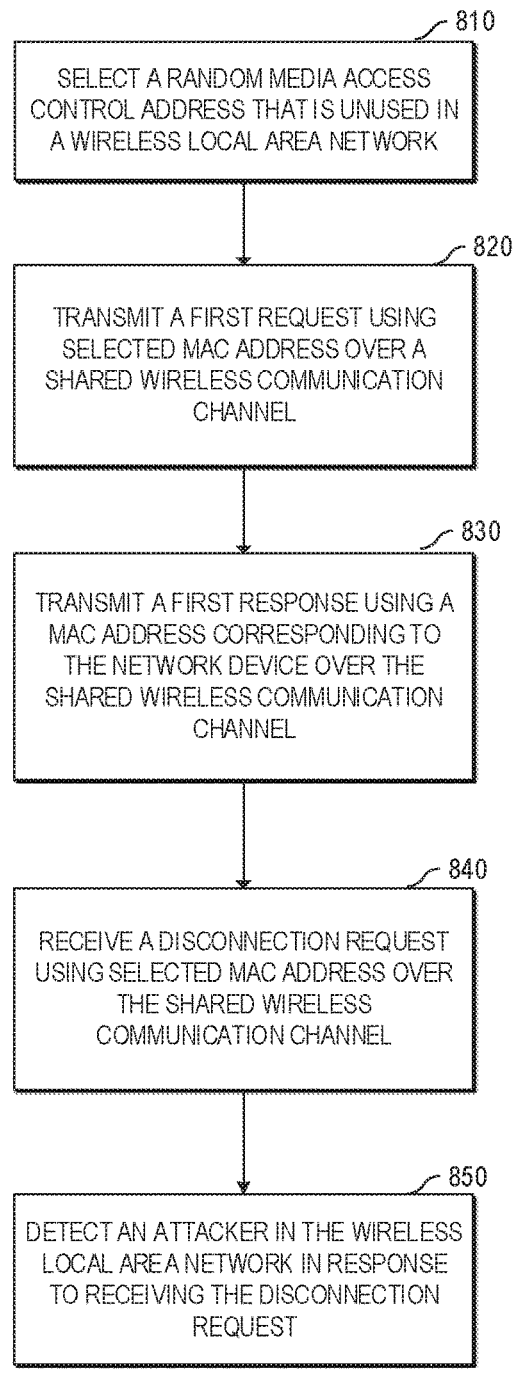
FIG. 8 is a flowchart of an example process for detecting a deauthentication and/or disassociation attack on the wireless local area network.

FIG. 8 is a flowchart of an example process for detecting a deauthentication and/or disassociation attack on the wireless local area network. In this example, a network device first selects a random Media Access Control (MAC) address that is unused in a wireless local area network (WLAN) (operation 810). Then, the network device transmits a first request using the selected MAC address over a shared wireless communication channel (operation 820). Next, the network device transmits a first response using a MAC address corresponding to the network device over the shared wireless communication channel (operation 830). Subsequently, the network device receives a disconnection request using the selected MAC address over the shared wireless communication channel (operation 840). Thereafter, the network device detects an attacker in the wireless local area network in response to receiving the disconnection request (operation 850).

Here, the first request may include one or more of a probe request, an authentication request, an association request, and a reassociation request. Moreover, the first response may include one or more of a probe response, an authentication response, an association response, and a reassociation response. Furthermore, the disconnection request may include one or more of a de-authentication request and a disassociation request.

In some implementations, the network device involves an access point. Also, the selected MAC address is used to emulate a client device in the wireless local area network; and the shared wireless communication channel is accessible to the attacker.

In some implementations, the network device further determines a received signal strength indicator (RSSI) corresponding to the disconnection message received by the network device. In addition, the network device determines a plurality of RSSIs associated with signals corresponding to the disconnection message received by other access points in the wireless local area network. Further, the network device can locate the attacker through triangulation based on the RSSI corresponding received by the network device and the plurality of RSSIs corresponding to signals received by the other access points.

In some implementations, the network device further transmits a second request using the selected MAC address over the shared wireless communication channel. Also, the network device transmits a second response using the MAC address corresponding to the network device over the shared wireless communication channel. Here, the first request includes a probe request; the first response includes a probe response; the second request includes an authentication request; and, the second response includes an authentication response.

In some implementations, the network device further transmits a third request using the selected MAC address over the shared wireless communication channel. Moreover, the network device can transmit a third response using the MAC address corresponding to the network device over the shared wireless communication channel. Here, the third request includes an association (or reassociation) request; and, the third response includes an association (or reassociation) response.

Figure 9:
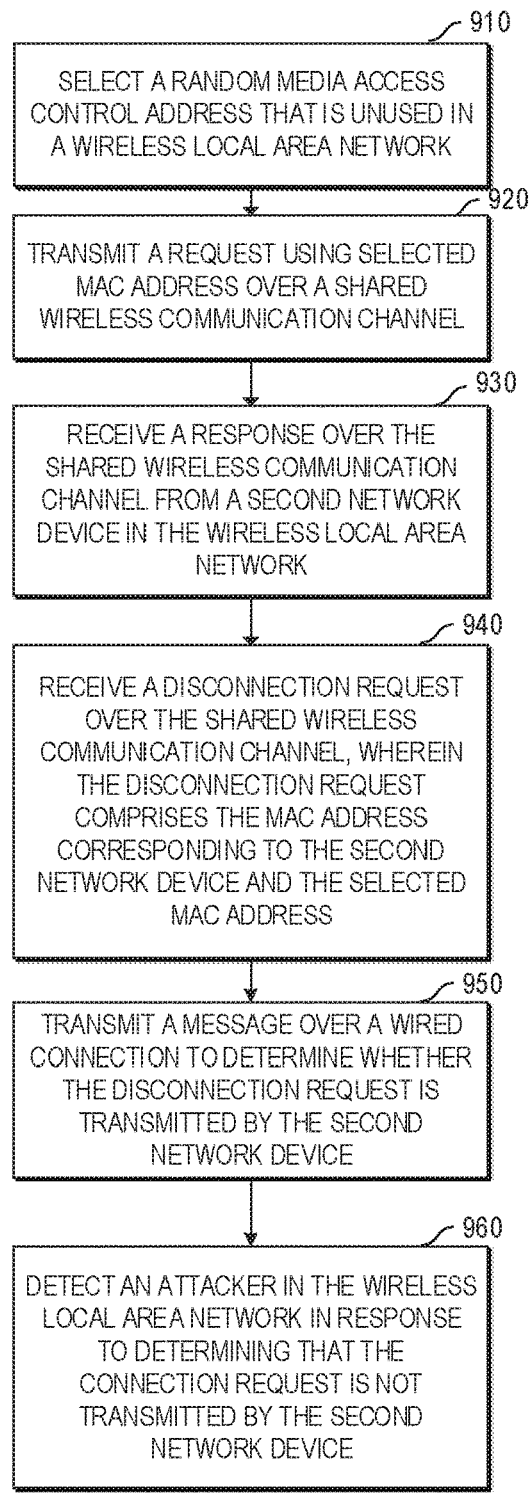
FIG. 9 is a flowchart of an example process for detecting a deauthentication and/or disassociation attack on the wireless local area network.

FIG. 9 is a flowchart of example process for detecting a deauthentication and/or disassociation attack on the wireless local area network. In this example, a network device first selects a random Media Access Control (MAC) address that is unused in a wireless local area network (operation 910). The selected MAC address is used to emulate a client device in the wireless local area network. The network device then transmits a request using the selected MAC address over a shared wireless communication channel (operation 920). Next, the network device receives a response over the shared wireless communication channel from a second network device in the wireless local area network (operation 930). Subsequently, the network device receives a disconnection request over the shared wireless communication channel, wherein the disconnection request includes the MAC address corresponding to the second network device and the selected MAC address (operation 940). Then, the network device transmits a secure message over a wired connection to determine whether the disconnection request is transmitted by the second network device (operation 950). Further, the network device will detect an attacker in the wireless local area network in response to determining that the connection request is not transmitted by the second network device (operation 960). Here, the first network device and the second network device are access points in the wireless local area network. Moreover, the message over the wired connection can be transmitted to the second network device (e.g., another access point), a network controller, or a master network controller in a controller cluster that manages client devices and access points in the wireless local area network.

In some implementations, the first request may include a probe request, an authentication request, an association request, and/or a reassociation request. The first response may include a probe response, an authentication response, an association response, and/or a reassociation response. Furthermore, the disconnection request may include a de-authentication request and/or a disassociation request.

Detecting Deauthentication/Disassociation Attack by RSSI Monitoring

Figure 10:
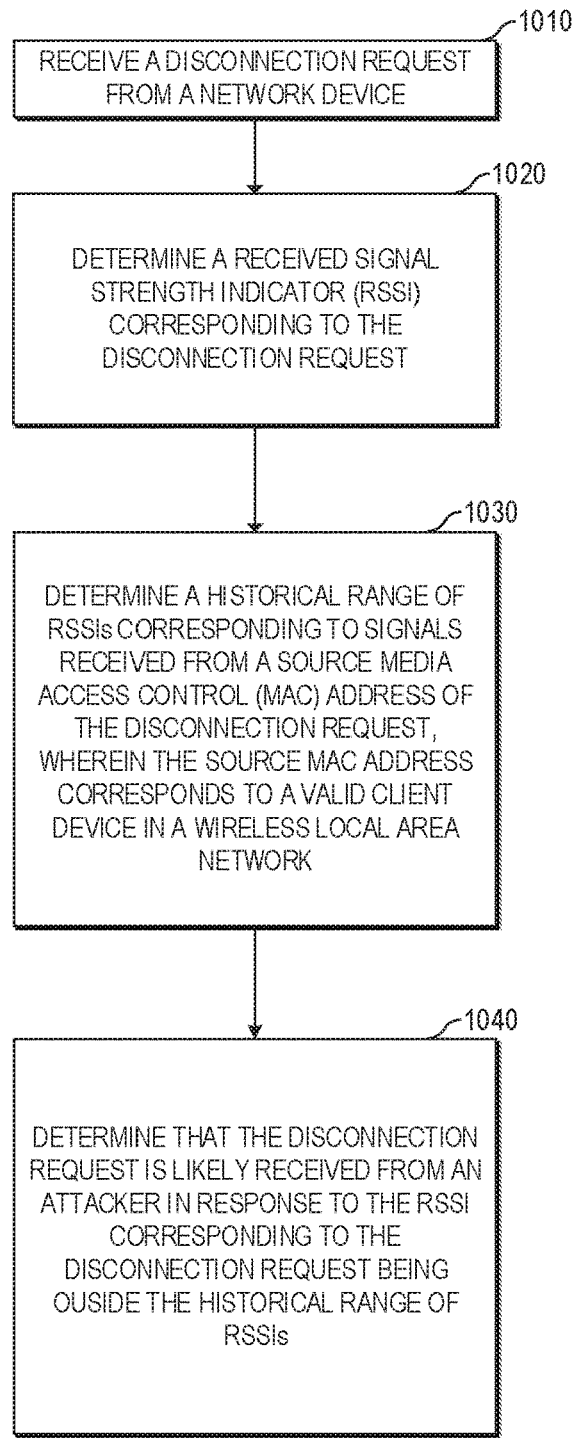
FIG. 10 is a flowchart of an example process for detecting a deauthentication and/or disassociation attack on the wireless local area network.

FIG. 10 is a flowchart of an example process for detecting a deauthentication and/or disassociation attack on the wireless local area network. In this example, a network device receives a disconnection request from another network device (operation 1010). The disclosed network device then determines a received signal strength indicator (RSSI) corresponding to the disconnection request (operation 1020). Next, the disclosed network device determines a historical range of RSSIs corresponding to the signals received from a source MAC address of the disconnection request (operation 1030). Here, assuming that the source MAC address corresponds to a valid client device in a wireless local area network.

Then, the disclosed network device can determine that the disconnection request is likely received from an attacker in response to the RSSI corresponding to the disconnection request being outside the historical range of the RSSIs (operation 1040). This is because an RSSI outside the historical range of RSSIs corresponding to signals received from a client device generally indicate that the client device has a different transmitting power or is at a different location than its usual location. Therefore, the sender of the disconnection request is a potential attacker.

In some implementations, the network device detects an attack if the difference between the RSSI corresponding to the disconnection request and the maximal or minimal value of the historical range exceeds a predetermined threshold value.

In some implementations, the disclosed network device further ignores the disconnection request. Then, the disclosed network device determines whether a plurality of disconnection requests are subsequently received from the network device. In response to the plurality of disconnection requests being subsequently received from the network device, the disclosed network device determines that the network device is an attacker in the wireless local area network. Note that the disconnection request may include, but is not limited to, a de-authentication request and/or a disassociation request.

Machine Readable Storage Medium to Detect Deauthentication and/or Disassociation Attack The present disclosure also may be embedded in a non-transitory computer-readable storage medium (e.g., a programmable circuit; a semiconductor memory such as a volatile memory such as random access memory "RAM," or non-volatile memory, such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Figure 11:
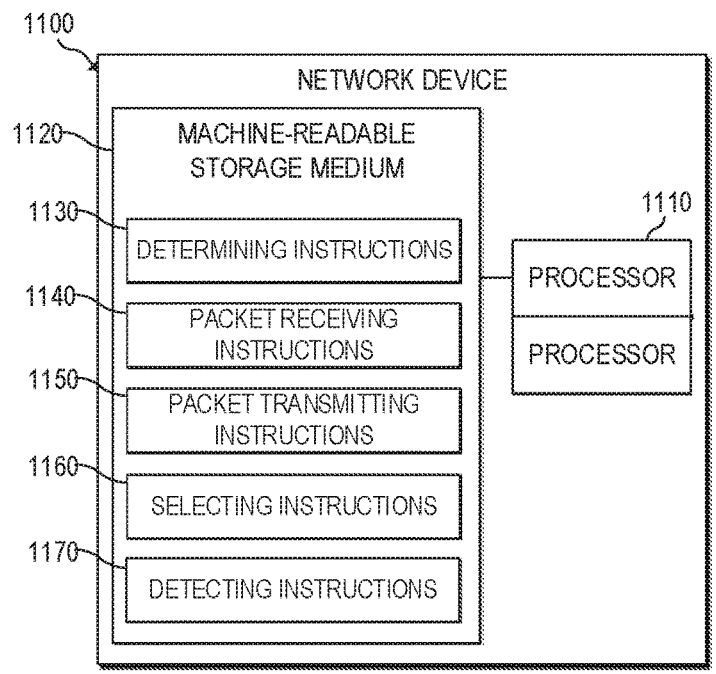
FIG. 11 is a block diagram of an example network device for detecting a deauthentication and/or disassociation attack on the wireless local area network.

FIG. 11 is a block diagram of an example network device for detecting a deauthentication and/or disassociation attack on the wireless local area network. Network device 1100 generally includes a device suitable for transmitting and/or receiving network signals and for processing information within such network signals in order to provide network services to client devices, such as, an access point, a network switch, a router, a network controller, a server, a network data center, etc. As illustrated in FIG. 11, network device 1100 includes one or more processors 1110 and a machine-readable storage medium 1120.

Processor 1110 may be one or more central processing units (CPUs), CPU cores, semiconductor-based microprocessors, and/or other hardware devices suitable for retrieval and execution of instructions stored in machine-readable storage medium 1120. Processor 1110 may fetch, decode, and execute instructions 1130, 1140, 1150, 1160, and 1170 to control the process for detecting a deauthentication and/or disassociation attack. As an alternative or in addition to retrieving and executing instructions, processor 1110 may include one or more electronic circuits that include electronic components for performing the functionality of one or more of instructions 1130, 1140, 1150, 1160, and 1170.

Machine-readable storage medium 1120 may be any electronic, magnetic, optical, or other physical storage device that contains or stores executable instructions. Thus, machine-readable storage medium 1120 may be, for example, Random Access Memory (RAM), an Electrically Erasable Programmable Read-Only Memory (EEPROM), a storage device, an optical disc, and the like. In some implementations, machine-readable storage medium 1120 may be a non-transitory storage medium, where the term "non-transitory" does not encompass transitory propagating signals. As described in details below, non-transitory machine-readable storage medium 1120 may be encoded with a series of executable instructions 1130, 1140, 1150, 1160, and 1170 for determining various parameters, network status, and so on; for receiving and transmitting network packets; for selecting MAC addresses; for detecting a security attack; etc.

Specifically, determining instructions 1130 include instructions to determine a received signal strength indicator (RSSI) corresponding to the disconnection message received by network device 1100. Further, determining instructions 1130 include instructions to determine a plurality of RSSIs associated with signals corresponding to the disconnection message received by other access points in the wireless local area network, and to locate an attacker based on the RSSI corresponding to the signal received by the network device and the plurality of RSSIs corresponding to the signals received by the other access points.

In some implementations, determining instructions 1130 include instructions to determine a historical range of RSSIs corresponding to signals received from a source Media Access Control (MAC) address of the disconnection request. Here, the source MAC address corresponds to a valid client device in a wireless local area network. In response to the RSSI corresponding to the disconnection request being outside the historical range of RSSIs, determining instructions 1130 also include instructions to determine that the disconnection request is likely received from an attacker.

In some implementations, whereas packet receiving instructions 1140 instruct one or more processors 1110 to ignore the disconnection request, determining instructions 1130 include instructions to determine whether a plurality of disconnection requests are subsequently received from another network device. In response to the plurality of disconnection requests being subsequently received from the other network device, determining instructions 1130 include instructions to determine that the other network device is an attacker in the wireless local area network.

Packet receiving instructions 1140 generally include instructions to receive packets from the network. In particular, packet receiving instructions 1140 include instructions to receive a response over a shared wireless communication channel from a second network device in the wireless local area network. Also, packet receiving instructions 1140 include instructions to receive a disconnection request using the selected MAC address over the shared wireless communication channel. In some implementations, packet receiving instructions 1140 include instructions to ignore the received disconnection request.

Packet transmitting instructions 1150 generally include instructions to transmit a message to the network over a shared wireless communication channel and/or via a wired connection. Specifically, packet transmitting instructions 1150 include instructions to transmit a first request using the selected MAC address over a shared wireless communication channel; to transmit a first response using a MAC address corresponding to the network device over the shared wireless communication channel; to transmit a second request using the selected MAC address over the shared wireless communication channel; to transmit a second response using the MAC address corresponding to the network device over the shared wireless communication channel; to transmit a third request using the selected MAC address over the shared wireless communication channel; to transmit a third response using the MAC address corresponding to the network device over the shared wireless communication channel; etc.

In one example implementation, the first request comprises a probe request message; the first response comprises a probe response message; the second request comprises an authentication request message; the second response comprises an authentication response message; the third request comprises an association (or reassociation) request message; and, the third response comprises an association (or reassociation) response message.

In some implementations, packet transmitting instructions 1150 also include instructions to transmit a message over a wired connection to determine whether the disconnection request is transmitted by the second network device.

Selecting instructions 1160 generally include instructions to select a random Media Access Control (MAC) address that is unused in a wireless local area network. Specifically, the selected MAC address can be used to emulate a client device in the wireless local area network.

Detecting instructions 1170 generally include instructions to detect an attacker in the wireless local area network in response to receiving the disconnection request. Specifically, detecting instructions 1170 include instructions to detect an attacker in the wireless local area network in response to determining that the disconnection request is not transmitted by another authorized network devices in the WLAN.

Network Device to Detect Deauthentication/Disassociation Attack

Figure 12:
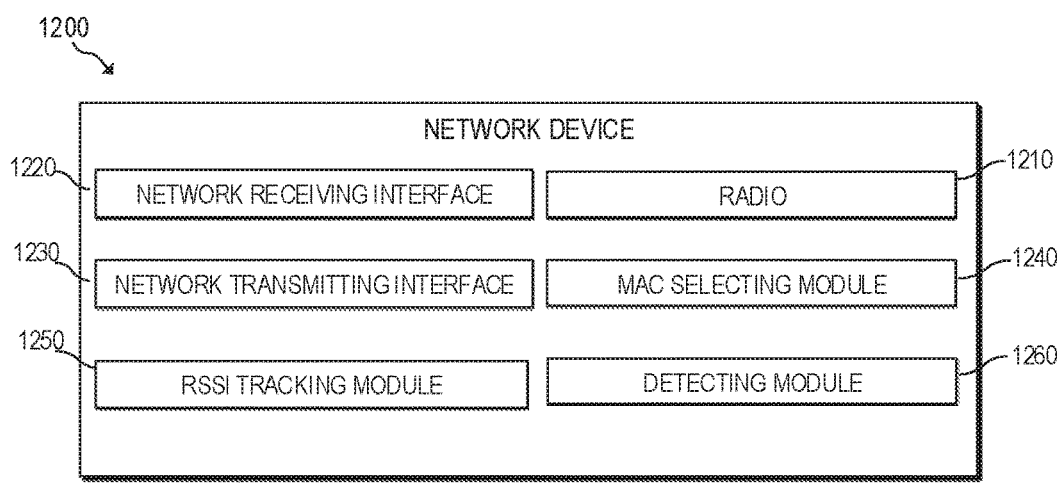
FIG. 12 is a block diagram of an example network device for detecting a deauthentication and/or disassociation attack on the wireless local area network.

FIG. 12 is a block diagram of an example network device for detecting a deauthentication and/or disassociation attack on the wireless local area network. As with network device 1100 of FIG. 11, network device 1200 may be any electronic device suitable for transmitting and/or receiving network signals and for processing information within such network signals in order to provide network services to client devices, such as, an access point, a network switch, a router, a network controller, a server, a network data center, etc. As illustrated in FIG. 12, network device 1200 includes at least a radio 1210, a network receiving interface 1220, a network transmitting interface 1230, a MAC selecting module 1240, a RSSI tracking module 1250, a detecting module 1260, etc.

In particular, radio 1210 may be any combination of known or conventional electrical components for receipt of signaling, including but not limited to, transistors, capacitors, resistors, multiplexers, wiring, registers, diodes or any other electrical components known or later become known.

Network receiving interface 1220 typically is responsible for receiving network messages and/or packets, including but not limited to a probe request, a probe response, an authentication request, an authentication response, an association request, an association response, a reassociation request, a reassociation response, a deauthentication request, a disassociation request, etc.

Network transmitting interface 1230 typically is responsible for transmitting network messages and/or packets, including but not limited to, a probe request, a probe response, an authentication request, an authentication response, an association request, an association response, a reassociation request, a reassociation response, a deauthentication request, a disassociation request, etc.

MAC selecting module 1240 typically is responsible for selecting a random MAC address. The selected MAC address is unused by other devices in the WLAN and is used to emulate a client device by a network device.

RSSI tracking module 1250 typically tracks the received signal strength indicators (RSSIs) corresponding to signals received from client devices by the APs in the WLAN.

Detecting module 1260 typically detects an attacker in the WLAN. Specifically, detecting module 1260 is responsible for detecting a deauthentication and/or disassociation attack.

The foregoing disclosure describes a number of example implementations for improved network security in a wireless local area network. As detailed above, example implementations provide an intuitive, discoverable mechanism for detecting a deauthentication and/or disassociation attack in a WLAN. Additional implementations and advantages of such implementations will be apparent to those of skill in the art upon reading and understanding the foregoing description.

We claim:

1. A first network device comprising:
a memory;
one or more processors to:
select a random Media Access Control (MAC) address that is unused in a wireless local area network;
transmit a request using the selected MAC address over a shared wireless communication channel;
receive a response over the shared wireless communication channel from a second network device in the wireless local area network;
receive a disconnection request over the shared wireless communication channel, wherein the disconnection request comprises the MAC address corresponding to the second network device and the selected MAC address;
transmit a message over a wired connection to determine whether the disconnection request is transmitted by the second network device; and
detect an attacker in the wireless local area network in response to determining that the disconnection request is not transmitted by the second network device.

2. The network device of claim 1, wherein the message over the wired connection is transmitted to at least one of the second network device and a network controller that manages client devices and access points in the wireless local area network.

3. The network device of claim 1, wherein the first request comprises one or more of a probe request, an authentication request, and an association request.

4. The network device of claim 1, wherein the first response comprises one or more of a probe response, an authentication response, and an association response.

5. The network device of claim 1, wherein the disconnection request comprises one or more of a de-authentication request and a disassociation request.

6. The network device of claim 1, wherein the selected MAC address is used to emulate a client device in the wireless local area network.

* * * * *